United States Patent [19]

Richards

[11] Patent Number: 4,976,444

[45] Date of Patent: Dec. 11, 1990

[54] SEAL AND SEAL ASSEMBLY

[75] Inventor: Robert L. Richards, Dickenson, Tex.

[73] Assignee: Amoco Corporation, Chicago, Ill.

[21] Appl. No.: 396,941

[22] Filed: Aug. 21, 1989

[51] Int. Cl.$^5$ .................. F02F 11/00; F16J 15/48; F01D 11/02
[52] U.S. Cl. .................................... 277/53; 277/57; 277/173; 277/176; 415/98; 415/174.5
[58] Field of Search ..................... 277/53, 55, 57, 67, 277/173, 174, 176, 194; 415/93, 97, 98, 172.1, 174.2, 174.5, 173.5

[56] References Cited

U.S. PATENT DOCUMENTS

| | | | |
|---|---|---|---|
| 835,836 | 11/1906 | Schulz | 415/174.5 |
| 2,018,372 | 10/1935 | Mason | 277/53 |
| 3,131,942 | 5/1964 | Ertaud | 277/53 |
| 4,563,124 | 1/1986 | Eskew | 415/98 |
| 4,667,967 | 5/1987 | Deuring | 277/53 |
| 4,743,034 | 5/1988 | Kakabaker et al. | 277/53 |
| 4,840,535 | 6/1989 | Skarstad | 415/98 X |

FOREIGN PATENT DOCUMENTS

| | | | |
|---|---|---|---|
| 180168 | 10/1984 | Japan | 277/53 |
| 414281 | 12/1966 | Switzerland | 277/57 |
| 1071851 | 2/1984 | U.S.S.R. | 277/53 |

Primary Examiner—Allan N. Shoap
Assistant Examiner—Scott Cummings
Attorney, Agent, or Firm—Gary J. Cunningham; William H. Magidson; Ralph C. Medhurst

[57] ABSTRACT

This invention relates to a seal and seal assembly, comprising an annular sealing element including a first side in alignment with a radial axis and a second side opposite the first side, and an inner axial surface in alignment with an axial axis and an outer axial surface opposite the inner axial surface; and the first side including a plurality of inclined teeth having grooves therebetween, each tooth tapering from wide to narrow in a direction opposite the second side, at least one of the teeth extending away from the axial axis and one extending toward the axial axis.

20 Claims, 3 Drawing Sheets

Fig 6

SEAL AND SEAL ASSEMBLY

FIELD OF THE INVENTION

This invention relates to a seal and seal assembly, and more particularly, a seal comprising an annular sealing element including a first side in alignment with a radial axis and a second side opposite the first side, and an inner axial surface in alignment with an axial axis and an outer axial surface opposite the inner axial surface; and the first side including a plurality of inclined teeth having grooves therebetween, each tooth tapering from wide to narrow in a direction opposite the second side, at least one of the teeth extending away from the axial axis and one extending toward the axial axis.

BACKGROUND OF THE INVENTION

In various types of machinery, it is continuously a problem to seal the opening through which a rotatable shaft protrudes. The problem is manifested in the difficulty of preventing leakage or loss of pressure or loss of vacuum while at the same time avoiding undue shaft friction. The shaft friction can generate heat, cause loss of power, and even damage the machinery. One method of effecting a seal at a joint between a stationary element and a rotatable shaft has been through the use of packing, stuffing, or the like.

In rotary pumps, fans, compressors, agitators, and the like, a shaft projects through a casing in a region known as the "stuffing box" or "packing box." These terms were derived from the fact that in order to separate two environments, for example, to prevent leakage from one environment in a pump into another, and that within the pump and the atmosphere, material had to be stuffed or packed around the shaft where it passed through the casing. However, packing or stuffing causes considerable friction on the shaft.

Another method of effecting a seal has been to utilize O-rings. However, O-rings have presented a problem due to the difficulty of providing a proper material to accommodate the wear thereon when utilized with shafts that operate at high speed.

Typifying many of these prior art seals are those found in U.S. Pat. Nos. 4,371,176; 4,427,203; 1,011,671; 3,979,128; 4,501,431; 3,871,666; 4,726,696; 3,194,571; 4,545,764; 3,831,950; 3,445,121; 4,257,617; and 4,501,431. Also, many of these seals are found in European Patent No. 724,301, German Patent No. 3,420,523, German Patent No. 884,262, and Japanese Patent No. 180,168.

Presently, mechanical seals or wear rings are commonly used for sealing against liquids when using a rotating shaft. These seals consist of radial planar surfaces which are normal to the shaft axis, see for example, the wear rings illustrated in FIG. 3, and *Handbook on Pumps*, Oct. 1954, p. 83. The surfaces cooperate to function as a bearing. These wear rings often are constructed of metal, and therefore inherently possess the danger of "galling" or adhering upon contact, which can occur during start-up or when vibration occurs. This condition can cause a rapid failure of the seal. During operation, the above seals can easily become worn or deteriorated, and the wear and deterioration can be non-uniform circumferentially about the shaft because of a number of reasons, such as misalignment of the shaft with respect to the machinery with which it is used, or due to other factors, such as the seal becoming out of round or scarring due to rust or scale, or from harsh environments.

A labyrinth seal is another type of mechanical seal which is not fluid-tight but limits leakage by means of a tortuous path. The seal consists of a ring or a series of rings adapted to fit about a shaft with a goal to minimize leakage. A labyrinth seal offering advantages in terms of minimal leakage, is disclosed in commonly assigned, copending application, U.S. Ser. No. 150,222, entitled, *Seal for a Rotatable Shaft*, filed Mar. 25, 1988. This application discloses a dry seal which includes a single, elongated axially monolithic elastomeric sealing element, or a plurality of such sealing elements, each having a shaft side and a casing side. The shaft side is provided with a plurality of radially inwardly extending circumferential fins, each fin tapering towards an apex. The cross-section of each fin in a plane that includes the axis of the shaft is asymmetric. Two spaced fins define therebetween a circumferential purge chamber having at least one inlet which extends through the elastomeric sealing element to the purge chamber. The apices of the fins on each side of the purge chamber point in an axial direction away from the purge chamber. Each fin apex extends to the shaft, with minimal or substantially no clearance, when the seal is positioned about the shaft. Optionally, a plurality of adjacent fins having apices pointing in the same axial direction away from the purge chamber are provided on each side of the purge chamber to define therebetween a sealing chamber or chambers.

Despite the significant advances offered by that seal element, there remains a need for improved seals and assemblies comprising the same, particularly with respect to minimal leakage, long life expectancy and easy fabrication.

It is therefore an object of this invention to provide a self-aligning seal with improved performance and life expectancy, which minimizes friction between the seal and a shaft or impeller.

It is also an object of this invention to provide a seal which is efficient not only in terms of capabilities, but also in terms of its drastic reduction in down time of expensive machinery used in complex processes.

I have now found that the objects of this invention can be achieved by providing an improved seal and seal assembly, which includes: flexible teeth having sufficient lubricity and memory which provide multiple seals on an axial axis and a radial axis for enhanced seal efficiency; a floating feature which allows the seal to float in place within prescribed tolerances and clearances, and which can withstand unstable conditions such as vibration or contact, and superior chemical resistance and mechanical properties.

The present invention thus provides a high efficiency seal and seal assembly which minimizes leakage and recirculation of a fluid along a shaft, and more particularly, which minimizes leakage and recirculation of a fluid in a pump along an impeller.

SUMMARY OF THE INVENTION

The seal of the instant invention is an annular sealing element comprising a first side in alignment with a radial axis and a second side opposite said first side, and an inner axial surface in alignment with an axial axis and an outer axial surface opposite said inner axial surface; and said first side including a plurality of inclined teeth having grooves therebetween, each tooth tapering from wide to narrow in a direction opposite said second side, at least one of said teeth extending away from said axial axis and one extending toward said axial axis.

The instant invention also provides a seal assembly comprising an annular sealing element including a first side in alignment with a radial axis and a second side opposite said first side, and an inner axial surface in alignment with an axial axis and an outer axial surface opposite said inner axial surface, said first side including a plurality of inclined teeth having grooves therebetween, each tooth tapering from wide to narrow in a direction opposite said second side, at least one of said teeth extending away from said axial axis and one extending toward said axial axis; and an impeller ring at least partially within said sealing element including an axial surface and a radial surface, said axial surface adjacent to said inner axial surface of said sealing element and said radial surface adjacent to said first side of said sealing element.

DETAILED DESCRIPTION OF THE PREFERRED EMBODIMENT

While this invention is susceptible of embodiments in many forms, there are shown in FIGS. 1–6, two embodiments suitable for use in the practice of this invention, with the understanding that the present disclosure is not intended to limit the invention to the embodiments illustrated.

Figures 1, 2:
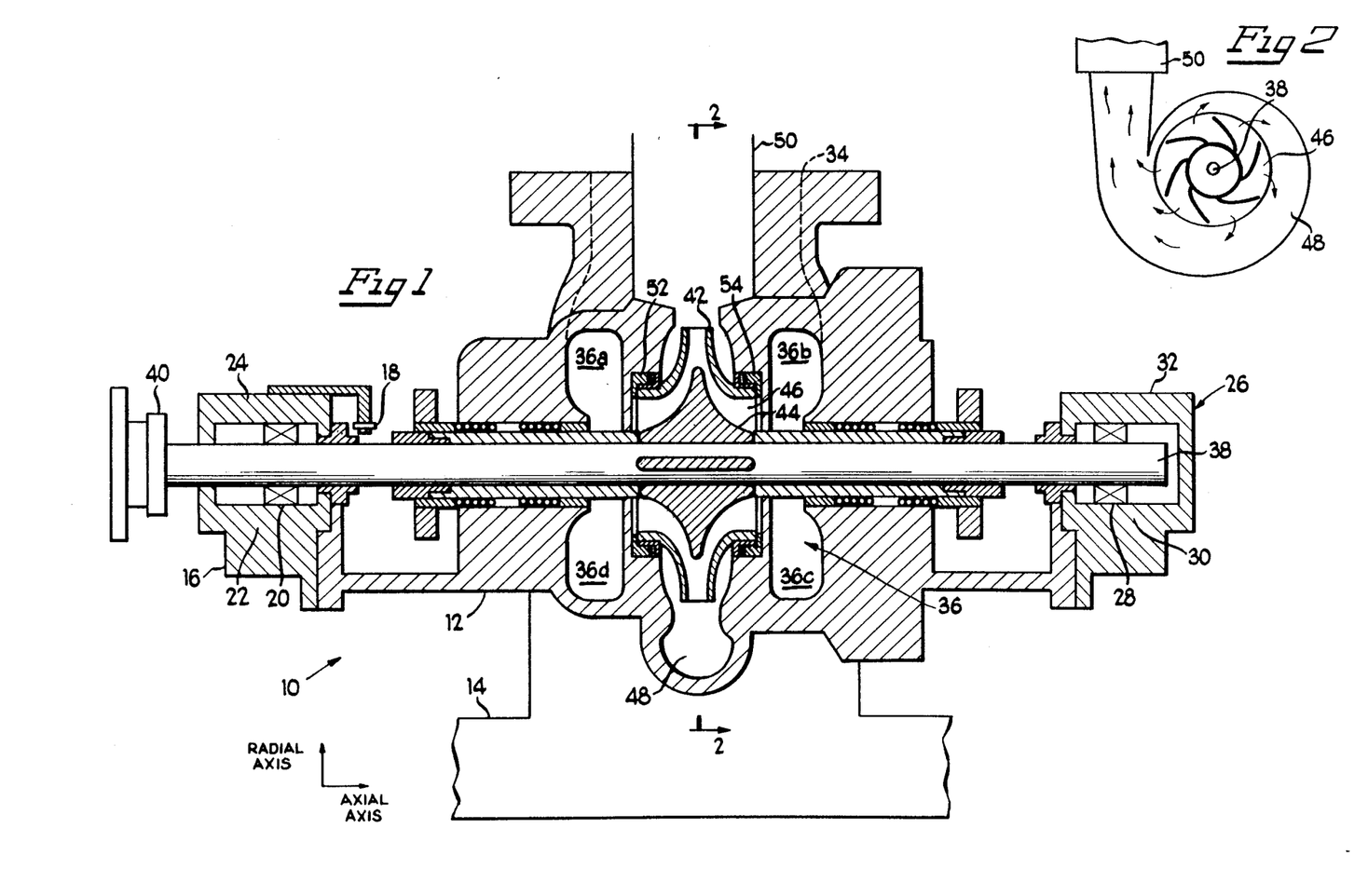
FIG. 1 is a cross-sectional view of a single-stage, double-suction centrifugal pump with a seal assembly in accordance with principals of the present invention.
FIG. 2 is a fragmentary cross-sectional view of the double-suction centrifugal pump taken substantially along line 2—2 of FIG. 1.

Illustrated in FIG. 1, is a conventional double-suction centrifugal pump 10. The pump 10 includes an elongated pump case 12 with a support stand 14 at the bottom. On one side of case 12 in FIG. 1, is an inboard section 16, which includes a probe 18 to measure shaft expansion and contraction, and thus impeller location due to the temperature change in and around the impeller, a radial bearing 20 and an inboard horizontal vibration measuring device 22 and an inboard vertical vibration measuring device 24. Similarly, on the other side of the case 12 is an outboard section 26, which has a thrust bearing 28, an outboard horizontal vibration measuring device 30 and an outboard vertical vibration measuring device 32. As will be appreciated by these skilled in the art, the probe 18 and vibration measuring devices 22, 24, 30, and 32, are not required for operation of pump 10, however, such devices have been included in the drawing to assist in understanding the testing reported in the Examples appearing herein below.

In operation, a liquid is normally fed from a source into an inlet line 34, generally in the middle of case 12. In FIG. 1, the inlet line 34 directs the liquid therefrom freely and uninterruptedly, to a low-pressure impeller suction section or input reservoir 36, which includes upper sections 36a and 36b and lower sections 36c and 36d.

As illustrated in FIG. 1, axially aligned with and in pump case 12, is an impeller 38. The impeller 38 is operatively attached to the radial bearing 20 of the inboard section 16 and the thrust bearing 28 of the outboard section 26. It will be understood by those skilled in the art that some of the conventional components of pump 10 have been simplified in FIG. 1. The impeller 38 is connected to a coupling means 40 in proximity to the inboard section 16 of the case 12, for rotatably coupling impeller 38 to a motor (not illustrated).

The impeller includes a middle section in proximity to and within the low pressure impeller suction section 36 of pump 10, which includes an outer shroud or back plate 42, an inner shroud or face plate 44, and a spiral vane 46 defined by the outer shroud and inner shroud 42 and 44, respectively. Referring to FIG. 2, the spiral vane 46 includes a plurality of spiral or twisting passageways or conduits which rotate with the impeller 38 during operation to pass liquid therethrough. The output of the spiral vane 46 directs or passes liquid into a high-pressure impeller discharge or discharge reservoir 48, illustrated in FIGS. 1 and 2. In the volute-type pump in FIG. 2, the spiral vane 46 of the impeller 38 discharges liquid into a progressively expanding spiral casing or high-pressure impeller discharge 48, proportioned to gradually reduce liquid velocity. Thus, the velocity energy is changed to pressure head in the volute or high-pressure impeller discharge 48, which in turn passes the liquid through outlet line or discharge line 50.

The high efficiency seal and seal assembly according to this invention, are illustrated in FIG. 1. The assembly includes an inboard seal assembly 52 and an outboard seal assembly 54, which is a mirror image of the inboard seal assembly 52. Among the many benefits of the instant high efficiency seal assemblies 52 and 54, a significant attribute is that these seals minimize leakage and recirculation of the liquid from the high pressure impeller discharge 48 to the low pressure impeller suction section 36 and spiral vane 46. Many more benefits will become apparent when the seal and seal assemblies in FIGS. 4–6 are discussed infra.

Figure 3:
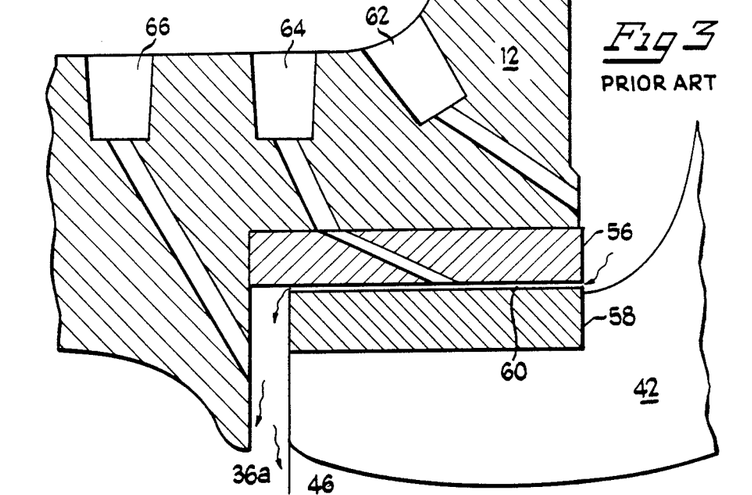
FIG. 3 is an enlarged cross-sectional view of a prior art wear ring.

Prior art or factory designed wear rings are illustrated in FIG. 3, which include a metallic stationary case wear ring 56 and a metallic rotating impeller wear ring 58. The cross-sections of rings 56 and 58 in FIG. 3 are rectangular. The case wear ring 56 is adjacent to the pump case 12, and the impeller wear ring 58 is adjacent to the outer shroud 42 of the impeller 38. A circular channel or clearance gap 60 between the case and impeller wear rings 56 and 58, allows substantial leakage therebetween from the high pressure impeller discharge 48, through channel 60, back to the spiral vane 46 and low pressure impeller suction section 36, as illustrated by the arrows in FIG. 3. Thus, liquid which has been drawn through the spiral vane 46 is disadvantageously recirculated back to the low pressure impeller suction section 36, which is unnecessarily redundant and inefficient. It will be noted that pump case 12 in FIG. 3 includes a high-test pressure tap 62, an intermediate-test pressure tap 64, and a low-test pressure tap 66; these features are not required in operation but are included in the drawing to facilitate understanding of the Examples, infra, in which the pressure above and along channel 60 was measured to determine leakage or unwanted recirculation through channel 60. Such wear rings 56 and 58 inherently posses the danger of "galling" or adhering of the case wear ring 56 to the impeller wear ring 58 upon contact, for example, when the impeller 38 or pump case 12 vibrate, since both rings 56 and 58 are metallic.

Figure 4:
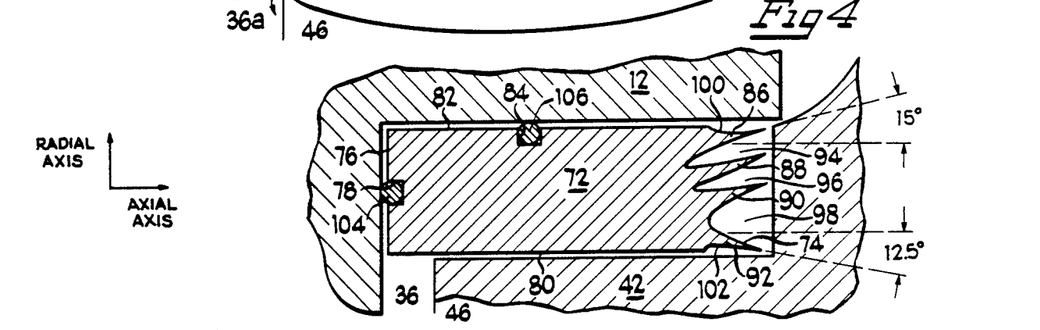
FIG. 4 is an enlarged cross-sectional view of a seal in accordance with principals of the present invention.
Figure 5:
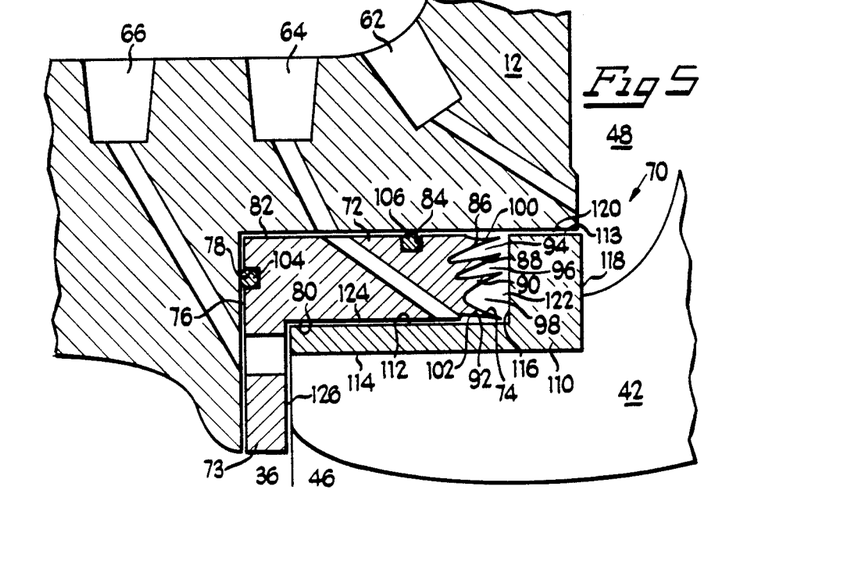
FIG. 5 is an enlarged cross-sectional view of a seal assembly in accordance with principals of the present invention.
Figure 6:
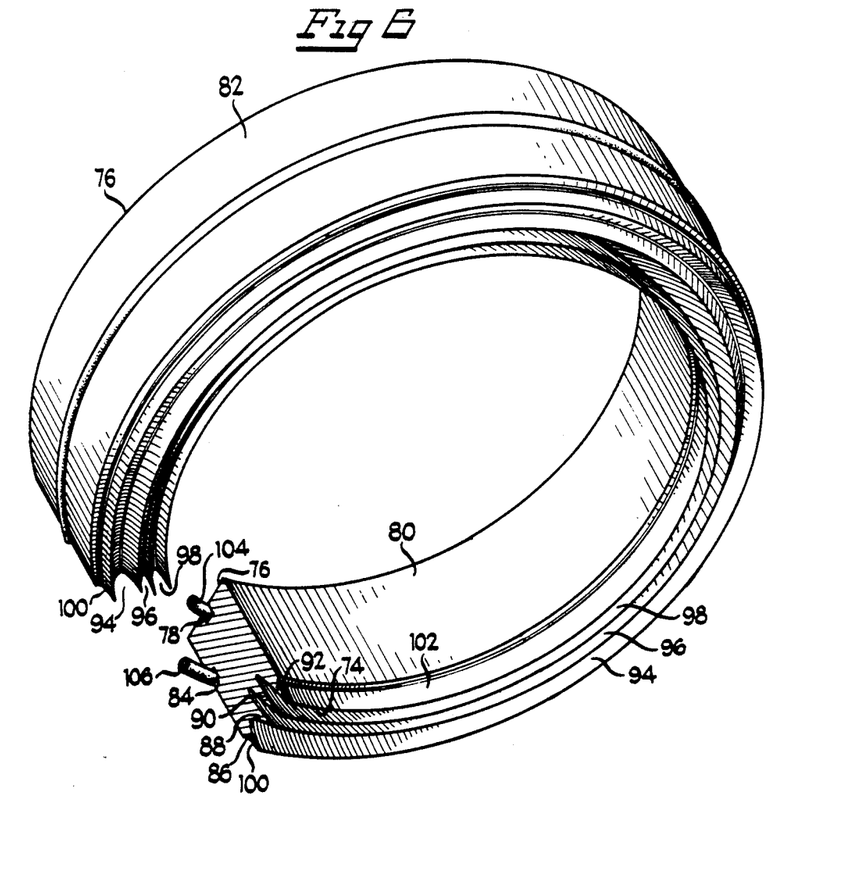
FIG. 6 is an enlarged perspective view partially cut away of the seal in FIG. 4 in accordance with principles of the present invention.

Referring to FIGS. 4 and 6, an embodiment of the invented seal or high efficiency wear ring 70 is illustrated, which includes only an annular sealing element or case wear ring 72 alone, although a preferred embodiment in FIG. 5 includes the annular sealing element 72 in combination with an impeller wear ring 110. The annular sealing element 72 can include an inwardly extending flange 73, as shown in FIG. 5. The annular sealing element 72 includes an impeller-facing side or first side 74 (right side in FIG. 4) parallel to and in alignment with a radial axis, and a case-facing side or second side 76 (left side in FIG. 4), preferably with a channel 78 adapted to receive an O-ring. The O-ring and inwardly extending flange 73 of second side 74, contribute to minimizing leakage between the second side 76 and case 12. The annular sealing element 72 also includes an inner axial surface 80 in alignment with and substantially parallel to an axial axis and an outer axial surface 82 opposite the inner axial surface 80, the outer axial surface 82 preferably includes a channel 84 adapted to receive an O-ring for minimizing leakage between outer axial surface 82 and case 12.

Referring to FIG. 6, the impeller-facing side or first side 74 of sealing element 72 includes a plurality of annular-inclined teeth, fins or wedges having grooves therebetween, so as to define a labyrinth all the way around first side 74. Each tooth tapers from wider to narrower from left to right in FIG. 4, or in a direction opposite the second side 76. As illustrated in FIG. 6, at least one of the teeth on the first side 74, extends outwardly away from the axial axis and one extends inwardly toward the axial axis. It should be understood by those skilled in the art, that any number of teeth or labyrinths can be included depending on the dimensions of the seal and conditions of use. Preferably, there are three substantially parallel and outwardly extending teeth pointing in a direction away from the axial axis, comprising a first tooth 86, a second tooth 88, and a third tooth 90. The teeth 86, 88, and 90 provide three seals on the radial axis. A fourth tooth 92 extends inwardly toward the axial axis to provide a fourth seal on the axial axis. Between the first, second, third, and fourth teeth 86, 88, 90, and 92, respectively, are outermost, intermediate, and innermost grooves 94, 96, and 98, respectively. Preferably, the first tooth 86 includes a first indentation 100 and the fourth tooth 92 includes a second indentation 102 for added flexibility of such teeth. The teeth 86, 88, 90, and 92 are generally wedge- or fin-shaped each having an apex pointing in a direction away from the second side 76. It should be appreciated by those skilled in the art, that the particular dimensions can vary from seal to seal depending on the equipment the seal 70 is utilized with.

In a preferred embodiment, O-rings 104 and 106 are inserted in channels 78 and 84, respectively, to further minimize leakage between the annular sealing element 72 and the pump case 12. In particular, O-ring 104 minimizes or prevents leakage between pump case 12 and the case facing side 76, and O-ring 106 minimizes or prevents leakage between pump case 12 and the outer axial side 82 of the annular sealing element 72.

In FIGS. 4 and 6, the first, second, and third teeth 86, 88, and 90 of the first side 74, extend outwardly away from the axial axis, at an inclination of less than about 80°, preferably less than about 30°, and most preferably about 15°. These angles are measured through the center line of the teeth 86, 88, 90, and 92 and through each apex thereof. The purpose of these angles is to provide adequate flexibility of the teeth. For example, under certain conditions, such as when the differential pressure across the tooth 86 is about 100 psi or less, an angle of about 30° or less, and preferably a 15° angle works best, because the pressure will push the teeth 86, 88, and 90 to close tolerances in the direction toward outer shroud 42 to minimize leakage as illustrated in FIG. 4. If the differential pressure across the teeth 86, 88, and 90 is substantially greater than 100 psi, the teeth 86, 88, and 90 would be configured at an angle of about 30° to about 15°, preferably about 15° or greater, because such teeth would need to be less flexible and ductile, and more rigid and resilient in order to withstand such higher pressures, in order to minimize leakage between the teeth 86, 88, and 90 and the outer shroud 42 in FIG. 4. The fourth tooth 92 in FIG. 4 extends inwardly toward the axial axis, at an inclination of less than about 80°, preferably less than about 25°, and most preferably about 12.5°, for the same reasons enumerated above with respect to teeth 86, 88, and 90. The grooves 94, 96, and 98 include varying depths. Preferably, the outermost groove 94 is deeper and has a larger volume than the intermediate groove 96, to substantially equalize the pressure drop over the first, second, and third teeth 86, 88, and 90, which further helps to allow the deflecting and flexing of the teeth 86, 88, and 90 to be substantially the same, for enhanced sealing.

The annular sealing element 72 can be made of any material which is capable of withstanding the environments to which the seal will be exposed during use and which is sufficiently ductile to allow for flexing of the teeth as discussed above. Preferably a thermoplastic material which has sufficient mechanical strength and chemical and thermal resistance is used. Examples include aromatic polymers such as polyamides, polyesters and polycarbonates, as well as polyaryl ethers, sulfones, ketones and the like. Most preferably an amide-imide polymeric material is employed, due to its desirable combination of advantageous characteristics, such as performance from about −320° F. to about +500° F.; outstanding mechanical strength; easy fabrication, e.g., by injection or compression molding or compaction sintering; low flammability; fatigue strength; impact strength; creep resistance; wear resistance; low coefficients of expansion; and excellent thermal stability. Alloying elements such as other thermoplastic materials including polyarylates, polyesters, poly(ether ether ketones), poly(aryl ether ketones), poly(aryl sulfones), poly(aryl ethers), other polyimides and polyamides, and the like, can be included with the polyamides-imides if desired.

The poly(amide-imide) polymers (PAI) are known engineering polymers and can be prepared by reacting components comprising an aromatic tricarboxylic acid compound, such as trimellitic acid (TMA) or 4-trimellitoyl anhydride halide (4-TMAC) and a diamine component comprising at least one wholly or partially aromatic primary diamine. The amide-imide polymers are preferably prepared by reacting an acyl halide derivative of an aromatic tricarboxylic acid anhydride with a largely or wholly-aromatic primary diamine or mixture thereof. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecules units of:

wherein the free carboxyl groups are ortho to one amide group, Z is an aromatic moiety containing 1 to 4 benzene rings or lower-alkyl-substituted benzene rings, R comprises one or more wholly- or largely-aromatic hydrocarbon radicals. These hydrocarbon radicals may be a divalent aromatic hydrocarbon radial of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—.

The polyamides are capable of substantially complete imidization by heating by which they form the polyamide-imide structure having to a substantial extent recurring units of:

wherein one carbonyl group is meta to and one carbonyl group is para to each amide group and wherein Z and R are defined as above. Typically the polyamides-imides have up to about 50 percent imidization prior to heat treatment, typically about 10 to about 40 percent.

The polyamide-imide copolymers are prepared from an anhydride-containing substance and a diamine component comprising wholly or partially aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower alkyl-substituted benzene ring, and most preferably, the substance is the acyl chloride derivative of trimellitic acid anhydride (4-TMAC).

When a mixture of diamines is used, such mixture can contain two or more, preferably two or three, wholly- or largely-aromatic primary diamines.

The wholly- or largely-aromatic primary diamines used in preparation of these polyamides-imides comprise an aromatic moiety containing 6 to about 10 carbon atoms or two or more divalent aromatic moieties of from 6 to about 10 carbon atoms, each moiety containing one primary amine group, and the moieties linked directly or through, for example, a bridging —O—, —S—, SO$_2$—, —CO—, or methylene group. Preferred diamines include oxybisaniline and metaphenelene diamine. When three diamines are used they are preferably selected from the class composed of:

and said X being an —O—, —CH$_2$—, or —SO$_2$— group. More preferably, the mixture of aromatic primary diamines is two-component and is composed of meta-phenylene-diamine (MPDA) and p,p'-oxybis(aniline) (OBA), p,p'-methylenebis(aniline) (MBA), and p,p'-oxybis(aniline), p,p'-sulfonylbis(aniline) (SOBA), and p,p'-oxybis(aniline), p,p'-sulfonylbis(aniline) and metaphenylene-diamine, or p,p'-sulfonylbis(aniline) and p,p'-methylenebis(aniline). Most preferably, the mixture of primary aromatic diamines contains metaphenylene-diamine and p,p'-oxybis(aniline). The aromatic nature of the diamines contributes to the excellent thermal properties of the copolymers while the primary amine groups permit the desired imide rings and amide linkages to be formed.

When two diamines are used to achieve a polymer usefully combining the properties of both diamines, it is usual to stay within the range of about 10 mole % of the first diamine and 90 mole % of the second diamine to about 90 mole % of the first diamine and 10 mole % of the second diamine. Preferably, the range is about a 20 to 80 mole percent to about an 80 to 20 mole percent. In the preferred embodiment wherein the acyl chloride of trimellitic acid anhydride is copolymerized with a mixture of p,p'-oxybis(aniline) and meta-phenylenediamine, the preferred range is from about 30 mole % of the former and about 70 mole % of the latter to about 70 mole % of the former and about 30 mole % of the latter.

As previously stated, a preferred sealing element 72 comprises a poly(amide-imide) composition, which can be injection or compression molded, or compaction sintered.

Injection molding techniques are known to persons of skill in the plastics fabrication art and are commonly referred to as reciprocating screw injection molding. The general principles of reciprocating screw injection molding are set forth below, it being understood that the description is intended for purposes of illustration.

In reciprocating screw injection molding, powdered or pelletized polymer is delivered to a hopper and from there fed into the feed end of a barrel, typically cylindrical, which houses a screw adapted for rotation and reciprocal motion within the barrel along the length thereof. The barrel also has a nozzle end opposite the feed end, and may have a chamber located near the nozzle end. Polymer fed from the hopper into the barrel passes into and through the area between flights of the rotating screw and, during such passage, is plasticated due to heat and the working of the polymer between the interior surface of the barrel and the surfaces between screw flights. Working of the polymer between screw flights and the interior of the barrel compacts the polymer between screw flights. After passing between the screw flights, the compacted, plasticated polymer accumulates in the barrel or in a chamber near the nozzle.

During rotation of the screw, pressure, commonly referred to as "back pressure," is applied to the end of the screw at the feed end of the barrel. An opposing pressure develops due to accumulation of polymer at the nozzle end of the barrel, and when this pressure exceeds the back pressure, the screw is pushed away from the nozzle. When the accumulating polymer fills the chamber or the portion of the barrel vacated by the screw, or in some instances, when the screw reaches a predetermined position, pressure, commonly referred to as "injection pressure," is applied to the screw, and the accumulated polymer is forced through the nozzle into a mold which is commonly heated. In some cases, a booster is used to aid in the injection. Typically, a non-return check valve is employed to prevent polymer from flowing back toward the screw. Following injection of the polymer into the mold, the polymer is held therein, the mold is cooled, and the molded part removed.

The exact conditions under which the polymers described herein are injection molded will vary depending upon the polymer to be molded, the polymer spiral flow, the injection molding equipment employed, and the molded article to be prepared. Typical operating conditions include barrel-set temperatures of from 600° F. to 700° F., injection pressures ranging from 10,000 psi to 30,000 psi and cycle times of between 75 seconds to 180 seconds, depending on the polymer used. Molding cycles also vary depending upon choice of polymer, molding equipment and the like.

Compression molding techniques also are suitable and are well known in the art. See, for example, Amoco Torlon ® Engineering Resins Bulletin, Code Number TAT-2, issued Oct. 1974. In this bulletin, Guidelines for Compression Molding of Torlon powders is disclosed. A standard hydraulic press, with adjustable closing speed, is utilized. A chrome plated, polished, hardened tool steel mold is used to minimize sticking of the polymer to the mold. Prior to molding, and later at regular intervals as required for proper part ejection, a light coat of a high temperature mold release can be applied. The resin is preconditioned by preheating the polymer, for example, to about 530° F. in a hot air oven. Insufficient preheating can result in a defective part caused by trapped moisture or a longer required cycle time. Preheating at too high a temperature causes lumps in the powder. The next step is the molding step, which comprises: 1. Filling a predetermined amount of preheated polymer into a mold preheated to a temperature above the glass transition temperature of the polymer, for example, about 620°–650° F. for certain polyamides-imides. 2. Compressing the polymer using a pressure sufficient to compact the polymer and forcing the polymer to conform to the polymer cavity, for example at approximately 4,000 psi. Minimum pressure requirements will vary somewhat depending on part geometry. 3. Maintaining the applied pressure until all the polymer is molten and the melt flows throughout the mold. 4. Cooling the mold to below glass transition temperature of the polymer, e.g., about 500° F. And, 5. ejecting the molded part as soon as it has cooled sufficiently. Thereafter, the compression molded ingot can be machined to the desired shape.

The superior chemical resistance and mechanical properties of compression molded polyamides-imides are particularly well-suited for replacement of metal parts in rotating machinery. The lubricity and memory inherent in this polymer is highly desirable for use in the invented sealing element. High efficiency designs can be achieved with this polymer that are difficult to achieve with current metal parts. For example, the invented seal can be mass produced at a modest cost by plunge cutting and gluing pieces together with amide-imide adhesive instead of intricate, multistep machining required for making metal seals. In highly oxidizing environments or services containing amines and/or caustics, other resins may be acceptable owing to their tolerance to such environments. Service temperatures can range from about −320° F. to 500° F.

Referring to FIG. 5, a preferred seal assembly 70 is illustrated, which comprises the combination of the aforementioned annular sealing element 72, and an impeller wear ring 110 at least partially within the annular sealing element 72. The impeller wear ring 110 has a smaller diameter than that of the sealing element 72. Preferably, the impeller wear ring 110 includes an axial surface 112 with an upwardly extending flange 113, opposing axial surface 114 opposite the axial surface 112, radial surface 116 and opposing radial surface 118 opposite the radial surface 116. The axial surface 112 of the impeller wear ring 110 is adjacent to the inner axial surface 80 of the annular sealing element 72, and the radial surface 116 is adjacent to the impeller facing side or first side 74 of the annular sealing element 72. The upwardly extending flange 113 of the axial surface 112 dams or blocks some of the liquid from the high pressure impeller discharge 48 from leaking or recirculating back to the low pressure impeller suction section 36 and spiral vane 46. The cross-sections of the impeller wear ring 110 and the annular sealing element 72 in FIG. 5 are generally L-shaped members. In a preferred embodiment, the annular sealing element 72 comprises the aforementioned poly(amide-imide) composition; and the impeller wear ring 110 can comprise the same composition or, preferably, a metallic composition because a metal ring 110 can withstand severe centrifugal forces when rotating without deforming. In use, the impeller wear ring 110 provides a sacrificial component which rotates with the impeller 38, which if damaged, scratched or destroyed due to rust, scale and the like, can be discarded and replaced at a modest cost compared to the cost of replacing an impeller without a wear ring such as that designated as 110 in FIG. 5.

As previously indicated with respect to the factory-designed wear rings in FIG. 3, there is substantial leakage between the case wear ring 56 and impeller wear ring 58 in a direction from the high-pressure impeller discharge 48 through channel 60 to the spiral vane 46 and low-pressure impeller suction section 36. This illustrates substantial inefficiency in view of the recirculation of this liquid.

The seal assembly 70 of FIG. 5 has been carefully configured to minimize leakage and recirculation of liquid from the high-pressure impeller discharge 48 back to the spiral vane 46 and low pressure impeller suction section 36. For example, between the pump case 12 and flange surface 113 of the impeller wear ring 110, is a narrow wear ring-pump case gap 120. Between the sealing element 72 impeller facing side 74 and the radial surface 116 of the impeller wear ring 110 is a narrow sealing element-wear ring radial gap 122. Between the inner axial side 80 of the annular sealing element 72 and the axial surface 112 of the impeller wear ring 110 is a narrow sealing element-wear ring axial gap 124. And, between the flange 73 of the sealing element 72 and the outer shroud 42 of the impeller 38 is a narrow sealing element-impeller gap 126. The gaps 120, 122, 124, and 126 between the annular sealing element 72 and impeller wear ring 110 are configured to substantially reduce leakage and minimize recirculation therethrough.

In operation, the impeller wear ring 110 rotates along with the impeller 38, about or within the pump case 12 and annular sealing element 72. As previously stated, liquid is pushed due to high pressure from the high pressure impeller discharge 48 through gaps 120, 122, 124, and 126, back to the spiral vane 46 and the low pressure impeller suction section 36. Recirculation is substantially reduced or minimized by the teeth of the first side 74 of the annular sealing element 72 and the impeller wear ring 110. The liquid from the high pressure impeller discharge 48 and wear ring-pump case gap 120 is under a high pressure, which pushes the first, second and third teeth 86, 88 and 90 generally downwardly in FIG. 5, due to the teeth flexibility, thereby substantially narrowing or automatically reducing the sealing element-wear ring radial gap 122. Simultaneously, teeth 86, 88, and 90 are drawn downwardly due to the suction forces from the spiral vane 46 and the low pressure impeller suction section 36, which also contributes to substantially narrowing and reducing the sealing element-wear ring radial gap 122. Preferably, however, some leakage is desired for lubrication between annular sealing element 72 and impeller wear ring 110.

Similarly, the axial gap 124 in FIG. 5, is narrowed and reduced by the fourth tooth 92 being pushed downwardly by the liquid from the high-pressure impeller discharge 48, while simultaneously being drawn downwardly due to the suction forces from the spiral vane 46 and the low-pressure impeller suction section 36. Thus, the seal assembly 70 includes two concentric seals provided by narrow gaps 122 and 124.

Another problem with typical wear rings, such as the case and impeller wear rings 56 and 58 in FIG. 3, are that after they are installed, and the case 10 is assembled, the channel 60 is not uniform or concentric, because the impeller 38 due to gravity pushes the lower portion of the impeller wear ring 58 to practically touch the case wear ring 56, thereby narrowing the lower portion of the channel 60 while widening the upper portion of the channel 60. Stated differently, the case and impeller wear rings 56 and 58 are undesirably eccentric or do not have the same center, which causes substantial recirculation and leakage upon start-up of pump 10. This eccentricity problem is solved by the two seals of the invented seal assembly. More particularly, referring to FIG. 5, upon start-up, the seal element-wear ring radial gap 122 is substantially not affected by the eccentricity of annular sealing element 72 and impeller wear ring 110, because teeth 86, 88, and 90 and radial surface 116 provide a narrow gap regardless of the eccentricity of such components. Further, the sealing element 72 can float into place contributing to a good seal with minimal leakage.

The annular sealing element 72 and impeller wear ring 110 in FIG. 5, are configured within close tolerances to substantially minimize contact of such components. Preferably, the annular sealing element 72 and impeller wear ring 110 would contact each other in the undesirable event of excess impeller 38 vibration or bearing failure, and possibly during the start-up of pump 10. The inherent lubricity and memory of the preferred amide-imide polymer of the annular sealing element 72, minimizes damage or galling of the rotating impeller wear ring 110 to annular sealing element 72 on contact. Further, the seal assembly 70 is restored to the original clearances after an unstable condition has occurred, such as vibration or start-up due to the fact that the annular sealing element 72 floats in place.

In addition to the above features of the invented seal assembly 70, O-rings, such as those designated as 104 and 106 in FIG. 5, minimize leakage between the pump case 12 and the case facing side 76 and the pump case 12 and outer axial surface 82 of the annular sealing element 72, respectively. The O-rings 104 and 106 also allow the annular sealing element 72 to float and slide in place, thereby substantially maintaining the proper clearance gaps 120, 122, 124, and 126 automatically, after an unstable condition such as excessive vibration, bearing failure, start-up, and the like.

The first indentation 100 of first tooth 86 catches some of the liquid from the wear ring-pump case gap 120, and actually pushes the sealing assembly 72, to the left along the axial axis in FIG. 5, or in its proper position when in operation. In addition, the first indentation 100 further provides added flexibility of the first tooth 86. The second indentation 102, on the bottom of the fourth tooth 92, gives the fourth tooth 92 added flexibility to close or narrow the axial gap 124 in FIG. 5 during operation.

Preferably, the depth of the outermost groove 94 is larger than the depth of the intermediate groove 96, so as to substantially equalize the pressure drop across each of the first three teeth 86, 88, and 90 and to substantially equalize the flexion, bending or extending downwardly in operation, due to the aforesaid pushing force from the high pressure impeller discharge 48 and pulling or suction forces from the low-pressure impeller suction section 36 and spiral vane 46. Thus, preferably each of the teeth 86, 88, and 90 substantially have the same pressure drop and substantially the same deflection when in operation.

It should be understood by those skilled in the art that the holes in sealing element 72 which are connected to taps 64 and 66 in FIG. 5 are not necessary for the operation to this invention. Such holes were included for comparing the conventional wear rings in FIG. 3 with those of FIG. 5.

EXAMPLE

A twenty pound blend of 80% by weight poly(amide-imide), Torlon ® 4000 TF available from Amoco Performance Products, Inc., 12% by weight 9033 Graphite and 8% by weight Tetra fluoroethylene, Teflon ®, was placed in a tray and the tray with the blend was placed in a hot air oven for 18 hours.

The hot air oven temperature included the following: 2 hrs. @ 200° F.; 2 hrs. @ 250° F.; 2 hrs. @ 285° F.; 2 hrs. @ 325° F.; 1 hr. @ 400° F.; and 9 hrs. @ 485° F. A mold was preheated to 350° F. for the last 2 hours {i.e. at the 16th hour} of the above blend drying cycle. The mold at 350° F. was charged with the blend at 485° F. The charged mold was placed in a preheated oven at 500° F. The blend temperature was raised to 512° F. and maintained there for 45 minutes. The mold was then removed from the oven and wrapped with a blanket of insulation to hold the heat therein. The mold was next placed in a press and bumped sufficiently to remove the air and gas in the blended material. Bumping as used herein, includes squeezing the mold intermittently by stopping and starting the hydraulic press which squeezes the mold, to substantially remove the air and gas from the blended material in the mold. The mold was pressurized to 10000 psi and maintained under this pressure for 45 minutes. The pressure was slowly released over 12 minutes and the mold was placed into a preheated oven at 510° F. The blend temperature was then raised to 650° F. for 10 minutes. The mold was removed from the oven and wrapped with an insulation blanket to minimize heat loss. The mold was next placed in the press and the ram was rapidly closed. The blend was pressurized to 10000 psi and held for 6 hours. While still pressurized in the press, the mold was air cooled to 400° F. The pressure was released after 6 hours, and the mold was removed from the press and wrapped to allow the blend to slowly cool over 12 hours as described above. The mold was then reheated to 275° F. wherein an ingot formed from the blend was ejected. The ingot is tubular or donut shaped having a hollow inside, having an outer and inner diameter of 12 and 8 inches, respectively, and is 2 inches thick and 6 inches high. After cooling, the ingot was machined directly into the final desired part.

A seal assembly corresponding to that illustrated at 70 in FIG. 5 was tested against factory installed or prior art wear rings as depicted in FIG. 3, in a pump manufactured by Pacific Pumps, Inc., 10×18 HVC, illustrated in FIG. 1. This pump corresponding to the pump illustrated as 10 in FIG. 1 was selected for the test because of the severe service conditions involved, including contaminants such as rust and scale in the process stream and severe operating temperatures of from about 350° F. to 400° F.

The pump was carefully maintained and monitored so as to be within the factory designed tolerances and clearances. Three pressure taps were drilled on the outboard side of the pump case as illustrated by characters 62, 64, and 66 in FIG. 3 to establish a base line or factory design data for the prior art wear rings. Test probes were installed at the low pressure impeller suction section, at the high pressure impeller discharge, and at the three taps to measure the pressures at such locations. Also, a proximity probe was installed to monitor the differential expansion between the pump case and impeller, for determining the exact location of the impeller in operation. The pressures, temperature, vibration, and motor amperage data for the wear rings in FIG. 3 were recorded for hundreds of operating hours, see Test Nos. 1 through 10 of Table I.

The pump case was removed and the seal assembly which includes the sealing element 72 and impeller wear ring 110 of FIG. 5, was installed. The pump was returned to service and the same data were recorded for several operating hours, see Test Nos. 11 through 15 of Table I. Surprisingly and unexpectedly, the test results show a drastic reduction of pressure across the wear rings at the intermediate test pressure tap 64 in test numbers 11, 14, and 15, over the factory installed (prior art) wear rings 56 and 58 of FIG. 3. Recirculation between the sealing element 72 and impeller wear ring 110 was reduced significantly as shown by the small difference between the pump suction pressure (second column in Table I) and intermediate-test pressure tap 64 (sixth column in Table I) pressure in tests numbers 11, 14, and 15. Also, surprisingly and unexpectedly, the vibration readings in tests 11-15 at all points on the pump 10, did not increase in comparison to test numbers 1-10.

TABLE I

| Test No. | Pump Suction P(PSIG) | Pump Discharge P(PSIG) | Pump Process (T °F.) | High-Test Pressure Tap 62 (PSIG) | Inter.-Test Pressure Tap 64 (PSIG) | Low-Test Pressure Tap 66 (PSIG) |
|---|---|---|---|---|---|---|
| COMPARATIVE EXAMPLES | | | | | | |
| 1 | 44.50 | 146.5 | 378.44 | 105.5 | 72.5 | 47.7 |
| 2 | 43.50 | 146.0 | 378.0 | 104.0 | 72.0 | 47.7 |
| 3 | 42.5 | 145.0 | 379.0 | 104.5 | 73.5 | 46.5 |
| 4 | 42.3 | 145.0 | 388.0 | 104.0 | 72.0 | 46.5 |
| 5 | 44.3 | 147.0 | 379.25 | 105.0 | 73.0 | 48.2 |
| 6 | 42.2 | 146.0 | 375.13 | 104.0 | 72.0 | 46.2 |
| 7 | 41.0 | 144.0 | 374.81 | 103.2 | 72.0 | 45.5 |
| 8 | 41.6 | 144.0 | 374.88 | 103.5 | 71.0 | 45.5 |
| 9 | 42.5 | 146.0 | 375.1 | 104.0 | 72.0 | 46.2 |
| 10 | 42.0 | 146.0 | 374.53 | 104.5 | 73.0 | 46.2 |
| INVENTION EXAMPLES | | | | | | |
| 11 | 40.0 | 145.0 | 369.77 | 108.0 | 47.5 | 47.0 |
| 12 | 42.2 | 150.05 | 375.21 | 107.5 | *86.5 | **97.0 |
| 13 | 43.0 | 207.0 | 375.62 | 108.0 | *97.5 | **100+ |
| 14 | 43.5 | 146.7 | 375.5 | 106.5 | 48.0 | **98.0 |
| 15 | 42.1 | 146.0 | 396.11 | 105.0 | 47.0 | **98.0 |

| Test No. | Voltage of Shaft Growth at Probe 18 | Motor Amps | Horizontal Inboard Vibration at 22 (in./sec.) | Vertical Inboard Vibration at 24 (in./sec.) | Horizontal Outboard Vibration at 30 (in./sec.) | Vertical Outboard Vibration at 32 (in./sec.) |
|---|---|---|---|---|---|---|
| COMPARATIVE EXAMPLES | | | | | | |
| 1 | 4.8 | 200 | .27 | .32 | .27 | .23 |
| 2 | 5.0 | " | .26 | .24 | .30 | .25 |
| 3 | 5.0 | " | — | — | — | — |
| 4 | 5.0 | " | .15 | .18 | .20 | .18/.23 |
| 5 | 5.0 | " | .14 | .18 | .17 | .18/.22 |
| 6 | 5.2 | " | .15 | .18 | .19 | .23/.26 |
| 7 | 5.0 | " | .15 | .17 | .19 | .23/.28 |
| 8 | 5.8 | " | .16 | .18 | .20 | .20/.25 |

TABLE I-continued

| 9 | 5.5 | " | .14 | .18 | .21 | .23/.26 |
| --- | --- | --- | --- | --- | --- | --- |
| 10 | 5.7 | " | .16 | .20 | .21 | .20 |
| INVENTION EXAMPLES | | | | | | |
| 11 | 4.2 | 200 | .27 | .21 | .27 | .22 |
| 12 | 4.0 | " | .19 | .16 | .19 | .16 |
| 13 | 3.5 | " | .19 | .15 | .17 | .16 |
| 14 | — | " | — | — | — | — |
| 15 | 4.5 | " | .22 | .19/.23 | .19 | .18 |

*Readings of intermediate-test pressure tap 64 in Tests 12 and 13 are inaccurate due to instability and excessive pump temperature.
**Readings of low-test pressure tap 66 in Tests 12, 13, 14, and 15 are inconclusive.

Although specific embodiments of this invention have been shown and described, it is to be understood that various modifications and substitutions, as well as rearrangements and combinations of the preceding embodiments, can be made by those skilled in the art without departing from the novel spirit and scope of this invention.

I claim:

1. An annular sealing element comprising a first impeller-facing side in alignment with a radial axis and a second case-facing side opposite said first side, and an inner axial surface in alignment with an axial axis and an outer axial surface opposite said inner axial surface; said first side including a plurality of inclined teeth having grooves therebetween, each tooth tapering from wide to narrow in a direction opposite said second side, at least one of said teeth extending away from said axial axis and one extending toward said axial axis.

2. The seal of claim 1, wherein said teeth extending away from said axial axis are disposed at an angle of less than about 80 degrees with respect to said axial axis.

3. The seal of claim 1, wherein said tooth extending toward said axial axis is disposed at an angle of less than about 80 degrees with respect to said axial axis.

4. The seal of claim 1, wherein said teeth extending away from said axial axis include at least three teeth each disposed at an angle of less than about 30 degrees with respect to said axial axis.

5. The seal of claim 1, wherein said tooth extending toward said axial axis includes an inclination of less than about 25 degrees with respect to said axial axis.

6. The seal of claim 1, wherein said plurality of teeth are generally wedge shaped.

7. The seal of claim 1, wherein said second side of said sealing element has a channel.

8. The seal of claim 7, further comprising an O-ring adapted to fit at least partially in said channel of said second side.

9. The seal of claim 1, wherein at least one of said grooves has a different volume from at least one other of said grooves.

10. The seal of claim 1, further comprising an impeller ring at least partially within and adjacent to said sealing element.

11. The seal of claim 1, wherein said sealing element comprises a poly(amide-imide).

12. The seal of claim 1, wherein said sealing element comprises a thermoplastic, amide-imide resinous material comprising at least one of the following moieties:

wherein one carbonyl group is meta to and one carbonyl group is para to each amide group and wherein Z is a trivalent benzene ring or lower-alkyl-substituted trivalent benzene ring, R comprises one or more wholly- or largely-aromatic hydrocarbon radicals of from 6 to about 10 carbon atoms or two divalent aromatic hydrocarbon radicals of from 6 to about 10 atoms joined directly or by stable linkages selected from the group consisting of —O—, methylene, —CO—, —SO$_2$—, and —S—.

13. The seal of claim 11 wherein R is or

14. A seal assembly, comprising:
(a) an annular sealing element including a first impeller-facing side in alignment with a radial axis and a second case-facing side opposite said first side, and an inner axial surface in alignment with an axial axis and an outer axial surface opposite said inner axial surface, said first side including a plurality of inclined teeth having grooves therebetween, each tooth tapering from wide to narrow in a direction opposite said second side, at least one of said teeth extending away from said axial axis and one extending toward said axial axis; and
(b) an impeller ring at least partially within said sealing element including an axial surface and a radial surface, said axial surface adjacent to said inner axial surface of said sealing element and said radial surface adjacent to said first side of said sealing element.

15. The seal assembly of claim 14, wherein said teeth extending away from said axial axis include an inclination of less than about 30 degrees with respect to said axial axis, and said tooth extending toward said axial axis includes an inclination of less than about 25 degrees with respect to said axial axis.

16. The seal assembly of claim 14, wherein at least one of said grooves has a different depth from at least one other of said grooves.

17. The seal assembly of claim 14, wherein said impeller ring and said sealing element are generally L-shaped annular members.

18. The seal assembly of claim 14, wherein said sealing element includes a diameter greater than said impeller ring diameter.

19. The seal assembly of claim 14, wherein said teeth extending away from said axial axis include three substantially parallel teeth at an inclination of less than about 30 degrees with respect to said axial axis, and said tooth extending toward said axial axis includes an inclination of less than about 25 degrees with respect thereto.

20. The seal assembly of claim 14, wherein said plurality of teeth are generally wedge shaped and each includes an apex.

* * * * *